United States Patent
Lecrone et al.

(10) Patent No.: US 9,811,272 B1
(45) Date of Patent: Nov. 7, 2017

(54) FOUR SITE DATA REPLICATION USING HOST BASED ACTIVE/ACTIVE MODEL

(75) Inventors: Douglas E. Lecrone, Hopkinton, MA (US); Michael John Egan, Harvard, MA (US); Brett A. Quinn, Lincoln, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 331 days.

(21) Appl. No.: 13/338,719

(22) Filed: Dec. 28, 2011

(51) Int. Cl.
G06F 3/06 (2006.01)
G06F 11/20 (2006.01)
H04L 29/08 (2006.01)

(52) U.S. Cl.
CPC ............ *G06F 3/0619* (2013.01); *G06F 3/067* (2013.01); *G06F 3/0617* (2013.01); *G06F 11/2058* (2013.01); *G06F 11/2064* (2013.01); *G06F 11/2069* (2013.01); *G06F 11/2074* (2013.01); *G06F 11/2076* (2013.01); *H04L 67/1095* (2013.01)

(58) Field of Classification Search
CPC ............ G06F 11/2058; G06F 11/2069; G06F 11/2064; G06F 11/2076; G06F 11/2074; G06F 3/0617; G06F 3/0619; G06F 3/065; G06F 3/067; H04L 67/1095; H04L 67/40
See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,954,835 B1 | 10/2005 | Lecrone et al. | |
| 7,054,883 B2 | 5/2006 | Meiri et al. | |
| 7,058,731 B2 * | 6/2006 | Kodama | G06F 11/2058 710/1 |
| 7,475,207 B2 | 1/2009 | Bromling et al. | |
| 7,613,890 B1 | 11/2009 | Meiri | |
| 7,685,129 B1 | 3/2010 | LeCrone et al. | |

(Continued)

OTHER PUBLICATIONS

Stefaan Lemaire, "Mainframe Storage Strategy and Roadmap", Mar. 2011, Hitachi Data Systems.*

(Continued)

*Primary Examiner* — Rocio Del Mar Perez-Velez
(74) *Attorney, Agent, or Firm* — Muirhead and Saturnelli, LLC

(57) ABSTRACT

A system and method for data replication is provided. A host synchronously replicates data between a first local storage device and a second local storage device, the first local storage device and the second local storage device being coupled to the host. Data is then asynchronously replicated from the first local storage device and the second local storage device to at least one remote storage device. In an embodiment, each of the local storage devices may asynchronously replicate data to remote storage devices located at separate sites to provide four site data replication processing. The system described herein provides for advantageous and efficient swapping of control between hosts and storage devices located in different regions in response to disasters and/or other events affecting data storage in a particular region.

10 Claims, 16 Drawing Sheets

(56) References Cited

U.S. PATENT DOCUMENTS

| | | |
|---|---|---|
| 7,707,186 B2 | 4/2010 | LeCrone et al. |
| 7,779,291 B2 | 8/2010 | Yoder et al. |
| 2003/0188218 A1* | 10/2003 | Lubbers et al. ............... 714/5 |
| 2006/0069893 A1 | 3/2006 | LeCrone et al. |
| 2008/0104443 A1* | 5/2008 | Akutsu ............ G06F 11/2058 714/6.12 |
| 2008/0162844 A1* | 7/2008 | Yoder ............ G06F 11/2058 711/162 |
| 2010/0199042 A1* | 8/2010 | Bates ................ H04L 67/289 711/114 |
| 2011/0078396 A1* | 3/2011 | Hiraiwa et al. ............ 711/162 |

OTHER PUBLICATIONS

Gopal Ashok, Paul S. Randal, "SQL Server Replication: Providing High Availability using Database Mirroring", Microsoft, Mar. 2011.*

EMC Corporation, "The EMC z/OS Migrator: Best Practices Planning," White Paper, Jun. 2011, 22 pp.

U.S. Appl. No. 12/080,027, filed Mar. 31, 2008, Meiri et al.

* cited by examiner

FOUR SITE DATA REPLICATION USING HOST BASED ACTIVE/ACTIVE MODEL

TECHNICAL FIELD

This application relates to computer storage devices, and more particularly to the field of transferring data between storage devices.

BACKGROUND OF THE INVENTION

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a first storage device, denoted the "primary storage device" (or "R1") is coupled to the host. One or more other storage devices, called "secondary storage devices" (or "R2") receive copies of the data that is written to the primary storage device by the host. The host may interact directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

Data transfer among storage devices, including transfers for data replication or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired.

In an active/active storage system, if there are multiple interfaces to a storage device, each of the interfaces may provide equal access to the storage device. With active/active storage access, hosts in different locations may have simultaneous read/write access via respective interfaces to the same storage device. For both synchronous and asynchronous transfers within active/active systems, it may be desirable to maintain a proper ordering of writes such that any errors or failures that occur during data transfer may be properly identified and addressed such that, for example, incomplete data writes be reversed or rolled back to a consistent data state as necessary, Reference is made, for example, to U.S. Pat. No. 7,475,207 to Bromling et al. entitled "Maintaining Write Order Fidelity on a Multi-Writer System," which is incorporated herein by reference, that discusses features for maintaining write order fidelity (WOF) in an active/active system in which a plurality of directors (i.e. controllers and/or access nodes) at geographically separate sites can concurrently read and/or write data in a distributed data system.

For further discussions of data ordering and other techniques used for synchronous and asynchronous data replication processing in various types of systems, including types of Remote Data Facility (RDF) systems produced by EMC Corporation of Hopkinton, Mass., reference is made to, for example, U.S. Pat. No. 7,613,890 to Meiri, entitled "Consistent Replication Across Multiple Storage Devices," U.S. Pat. No. 7,054,883 to Meiri et al., entitled "Virtual Ordered Writes for Multiple Storage Devices," U.S. Patent App. Pub. No. 2006/0069893 A1 to LeCrone et al., entitled "Host Implementation of Triangular Asynchronous Replication," and U.S. patent application Ser. No. 12/080,027 to Meiri et al., filed Mar. 31, 2008, entitled "Active/Active Remote Synchronous Mirroring," which are all incorporated herein by reference and are assigned to the assignee of the present application.

U.S. Pat. No. 7,779,291 to Yoder et al., entitled "Four Site Triangular Asynchronous Replication," which is incorporated herein by reference, discloses features of a system to provide four site asynchronous replication among multiple destinations (e.g., storage devices) that store recovery data for a data center. The remote destinations may maintain maps that associate data being provided to a local destination with data stored on the remote destinations. The storage controllers at each of the remote destinations may be used to maintain and control replication features of the system using described techniques and mechanisms. In various circumstances, however, four site replication features controlled by respective storage controllers may be undesirably complex to maintain and subject to multiple failure points.

Accordingly, it would be desirable to provide an effective and efficient system to address issues like that noted above for providing data replication features in a distributed storage system, particularly in an active/active storage system.

SUMMARY OF THE INVENTION

According to the system described herein, a method for data replication includes using at least one host to synchronously replicate data between a first storage device and a second storage device, the first storage device and the second storage device being coupled to the at least one host. The method further includes replicating the data from each of the first storage device and the second storage device to at least one other storage device located remotely from the first and second storage devices. The first storage device may be located at a different site than the second storage device, and the at least one remote storage device includes two storage devices may be located at different remote sites that receive the data from the first and second storage devices, respectively. Each of the first storage device and the second storage device may be accessible for input/output (I/O) accesses by one or more hosts. The data synchronously replicated by the at least one host may be produced according to at least one of the following: (i) the at least one host generates the data that is synchronously replicated between the first storage device and the second storage device; or (ii) at least one host synchronously replicates the data by mirroring the data from the first storage device to the second storage device. The replicating of the data from each of the first storage device and the second storage device to at least one other storage device is performed asynchronously. The asynchronous data replication between the first storage device and the at least one other storage device may be completed at a different time than the asynchronous data replication between the second storage device and the at least one other storage device. The at least one other storage device may include a third storage device and a fourth storage device that are located at different remote sites, and the method may further include swapping operational control from the at least one host for the first storage device and the second storage device to at least one other host for the third storage device and the fourth storage device. The at least one other host may synchronously replicate data between the third storage device and the fourth storage device, the third storage device and the fourth storage device being coupled to the at least one other host, and the data from the third storage device and the fourth storage device may be replicated to the first storage device and the second storage device, respectively.

According further to the system described herein, a non-transitory computer readable medium stores software for data replication. The software includes executable code that, using at least one host, synchronously replicates data between a first storage device and a second storage device, the first storage device and the second storage device being coupled to the at least one host. Executable code is provided that asynchronously replicates the data from each of the first storage device and the second storage device to at least one other storage device located remotely from the first and second storage devices. The first storage device may be located at a different site than the second storage device, and the at least one other storage device may include two storage devices located at different remote sites that receive the data from the first and second storage devices, respectively. Each of the first storage device and the second storage device may be accessible for input/output (I/O) accesses by one or more hosts. The data synchronously replicated by the at least one host may be produced according to at least one of the following: (i) the at least one host generates the data that is synchronously replicated between the first storage device and the second storage device; or (ii) at least one host synchronously replicates the data by mirroring the data from the first storage device to the second storage device. The replicating of the data from each of the first storage device and the second storage device to at least one other storage device is performed asynchronously. The asynchronous data replication between the first storage device and the at least one other storage device may be completed at a different time than the asynchronous data replication between the second storage device and the at least one other storage device. The at least one other storage device may include a third storage device and a fourth storage device that are located at different remote sites, and the software may include executable code that swaps operational control from the at least one host for the first storage device and the second storage device to at least one other host for the third storage device and the fourth storage device. The at least one other host may synchronously replicate data between the third storage device and the fourth storage device, the third storage device and the fourth storage device being coupled to the at least one other host, and wherein the data from the third storage device and the fourth storage device may be asynchronously replicated to the first storage device and the second storage device, respectively.

According further to the system described herein, a system for performing data replication includes at least one host and a first storage device and a second storage device coupled to the at least one host. A third storage device is coupled to the first storage device and a fourth storage device coupled to the second storage device. Using the at least one host, data is synchronously replicated between the first storage device and the second storage device, and the data is asynchronously replicated data from the first storage device to the third storage device and from the second storage device to the fourth storage device. The first storage device may be located at a different site than the second storage device, and the third storage device and the fourth storage device may be located at different remote sites. The data synchronously replicated by the at least one host may be produced according to at least one of the following: (i) the at least one host generates the data that is synchronously replicated between the first storage device and the second storage device; or (ii) at least one host synchronously replicates the data by mirroring the data from the first storage device to the second storage device. The replicating of the data from each of the first storage device and the second storage device to at least one other storage device is performed asynchronously. The asynchronous data replication between the first storage device and the third storage device may be completed at a different time than the asynchronous data replication between the second storage device and the fourth storage device. The system may further include a non-transitory computer readable medium executable by at least one processor of the system, in which the non-transitory computer readable medium includes executable code that swaps operational control from the at least one host for the first storage device and the second storage device to at least one other host for the third storage device and the fourth storage device. The at least one other host may synchronously replicate data between the third storage device and the fourth storage device, the third storage device and the fourth storage device being coupled to the at least one other host, and the data from the third storage device and the fourth storage device may be asynchronously replicated to the first storage device and the second storage device, respectively.

DETAILED DESCRIPTION OF VARIOUS EMBODIMENTS

Figure 1:
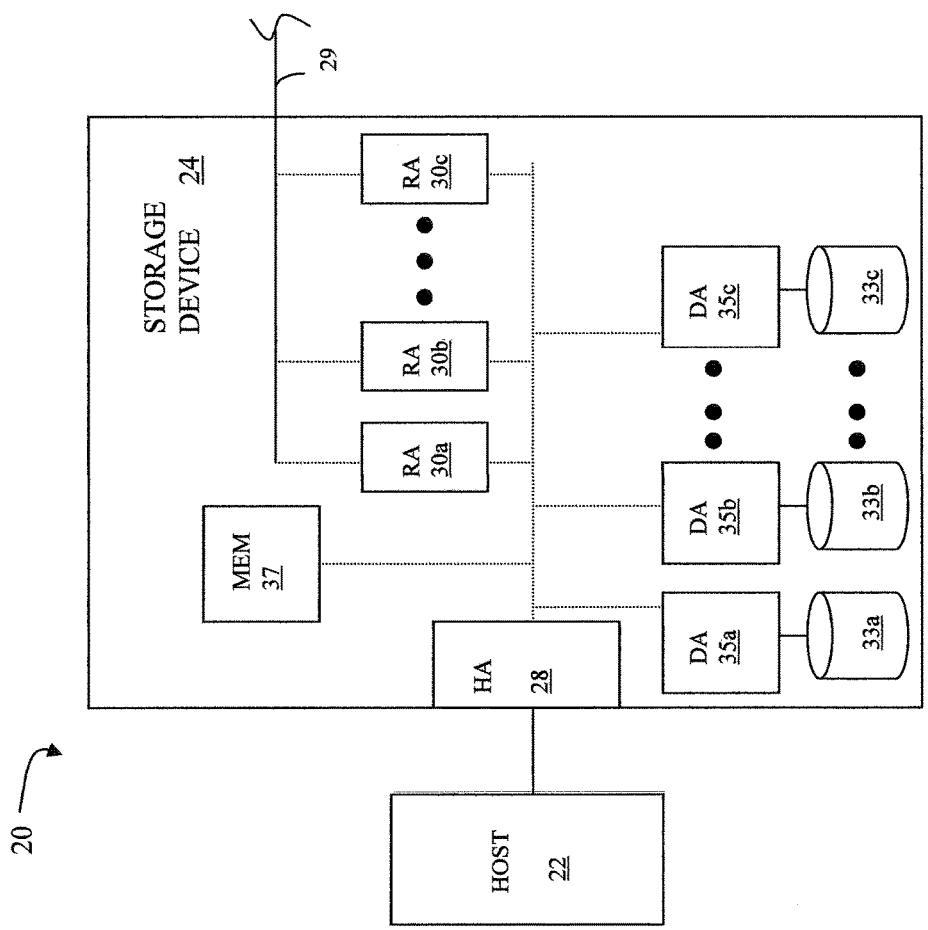
FIG. 1 is a schematic diagram showing a host and a storage device used in connection with an embodiment of the system described herein.

FIG. 1 is a schematic diagram 20 showing a relationship between a host 22 and a storage device 24. The host 22 reads and writes data from and to the storage device 24 via a host adapter (HA) 28, which facilitates the interface between the host 22 and the storage device 24. Although the diagram 20 only shows one host 22 and one HA 28, it will be appreciated by one of ordinary skill in the art that multiple HA's may be used and that one or more HA's may have one or more hosts coupled thereto.

The storage device 24 may include via a link 29, such as an RDF link, to cause data to transmitted to another device, such as another storage device (see storage device 26 in FIG. 3) that may be similar to, different from, the storage device 24. For example, data may be transmitted from the storage device to another storage device in connection with data mirroring operations. Although only the one link 29 is shown, it is possible to have additional links. In addition, the link 29 may be provided using a direct connection (wired, over-the-air, or some combination thereof), a network (such as the Internet), or any other appropriate means for conveying data. Note that there may be a time delay between the transfer of data from the local storage device 24 to the another storage device, so that the other storage device may, at certain points in time, contain data that is not identical to the data on the storage device 24. Communication using RDF is described, for example, in U.S. Pat. No. 5,742,792 to Yanai et al, which is incorporated by reference herein.

The storage device 24 may include a first plurality of remote adapter units (RA's) 30a, 30b, 30c. The RA's 30a-30c may be coupled to the link 29 and are similar to the host adapter 28, but are used to transfer data between storage devices. The software used in connection with the RA's 30a-30c is discussed in more detail hereinafter.

The storage device 24 may include one or more disks, each containing a different portion of data stored on the storage device 24. FIG. 1 shows the storage device 24 including a plurality of disks 33a, 33b, 33c, The RDF functionality described herein may be applied so that the data for at least a portion of the disks 33a-33c of the storage device 24 is copied, using RDF, to at least a portion of the disks of another storage device 26 (see FIG. 3). It is possible that other data of the storage devices 24, 26 is not copied between the storage devices 24, 26, and thus is not identical.

Each of the disks 33a-33c is coupled to a corresponding disk adapter unit (DA) 35a, 35b, 35c that provides data to a corresponding one of the disks 33a-33c and receives data from a corresponding one of the disks 33a-33c. An internal data path exists between the DA's 35a-35c, the HA 28 and the RA's 30a-30c of the local storage device 24. Note that, in other embodiments, it is possible for more than one disk to be serviced by a DA and that it is possible for more than one DA to service a disk.

The storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c.

The storage space in the storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b.

Figure 2:
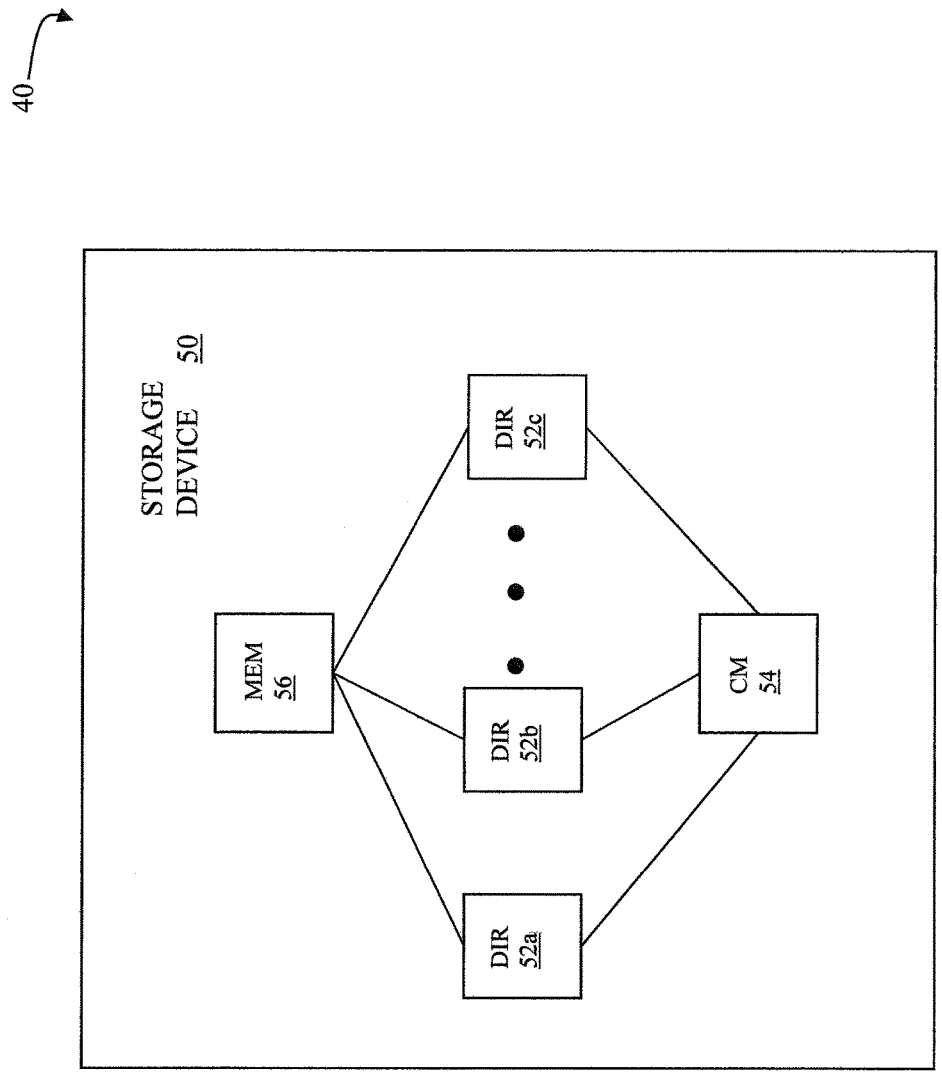
FIG. 2 is a schematic diagram showing a storage device, memory, a plurality of directors, and a communication module used in connection with an embodiment of the system described herein.

FIG. 2 is a schematic diagram 40 illustrating an embodiment where a storage device 50, which is like the storage device 24, includes a plurality of directors 52a-52c that are coupled to a memory 56, like the memory 37 of the storage device 24. Each of the directors 52a-52c may represent an HA, DA, and/or RA like the HA 28, the DA's 35a-35c, 36a-36c, and/or the RA's 30a-30c, 32a-32c of the storage device. In an embodiment disclosed herein, there may be up to sixteen directors coupled to the memory 56. Of course, for other embodiments, there may be a higher or lower maximum number of directors that may be used.

The diagram 40 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 56. The CM 54 may be implemented using conventional MUX/router technology where a sending one of the directors 52a-52c provides an appropriate address to cause a message and/or data to be received by an intended receiving one of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at one types of director and perform other processing with the other processing system.

Figure 3:
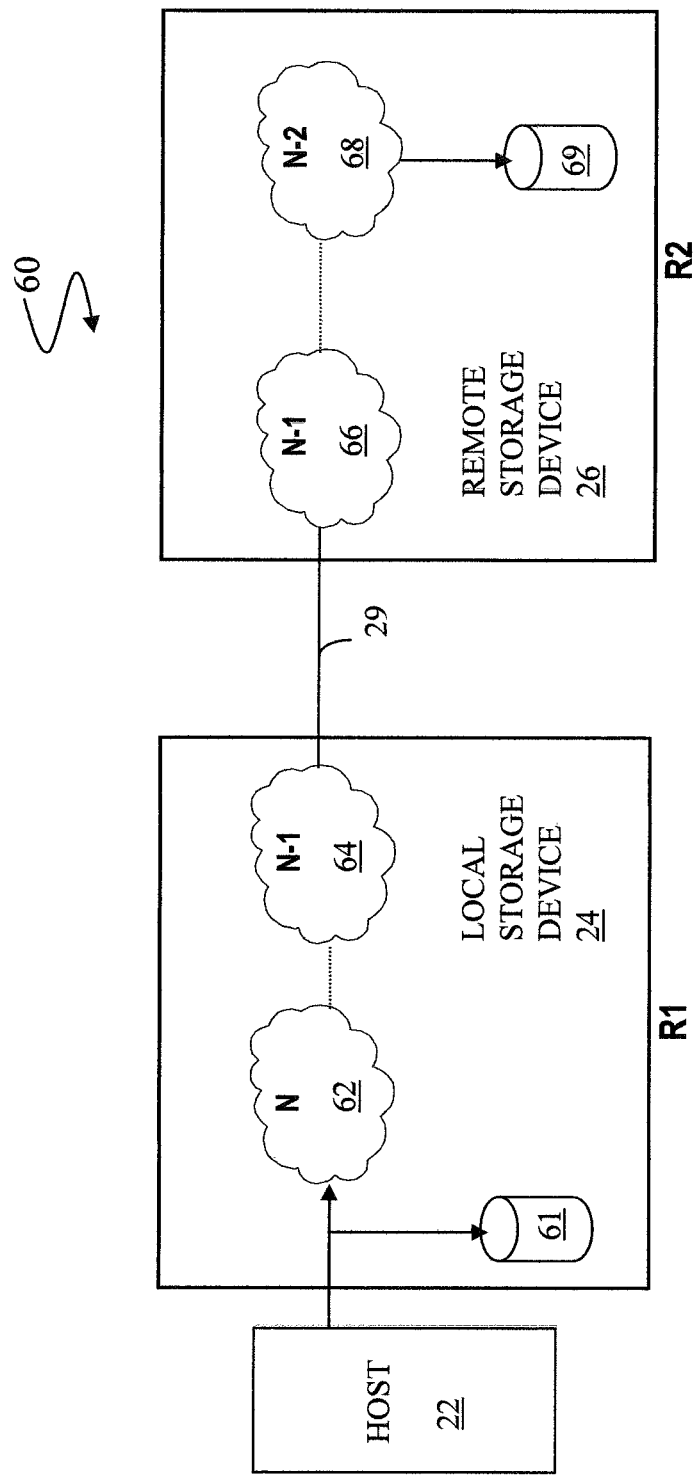
FIG. 3 is a schematic diagram showing an flow of data between a host, a local storage device, and a remote data storage device in connection with asynchronous data transfers that may be used in connection with an embodiment of the system described herein.

FIG. 3 is a schematic illustration 60 showing a path of data from the host 22 to the local storage device 24 and the remote storage device 26 in a system that may be used in connection with the system described herein for asynchronous data transfer processes between the local storage device 24 and the remote storage device 26. For example, the system described herein may be used in connection with an EMC Corporation Symmetrix Remote Data Facility (SRDF) product, such as SRDF/A (Asynchronous). Data written from the host 22 to the local storage device 24 is stored locally, as illustrated by the data element 61 of the local storage device 24. The data that is written by the host 22 to the local storage device 24 is also maintained by the local storage device 24 in connection with being sent by the local storage device 24 to the remote storage device 26 via the link 29.

Providing an RDF mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the RDF mapping causes modified data to be transferred from the local storage device 24 to the remote storage device 26 using the RA's, 30a-30c, 32a-32c and the RDF link 29. In steady state operation, the logical device on the remote storage device 26 contains data that is identical to the data of the logical device on the local storage device 24. The logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume. The system described herein may be implemented using software, hardware, and/or a combination of software and hardware where software may be stored in an appropriate storage medium and executed by one or more processors.

In the system described herein, each data write by the host 22 (of, for example a record, a plurality of records, a track, etc.) is assigned a sequence number. The sequence number may be provided in an appropriate data field associated with the write. The writes by the host 22 are shown as being assigned sequence number N. All of the writes performed by the host 22 that are assigned sequence number N are collected in a single chunk of data 62. The chunk 62 represents a plurality of separate writes by the host 22 that occur at approximately the same time.

Generally, the local storage device 24 accumulates chunks of one sequence number while transmitting a previously accumulated chunk (having the previous sequence number) to the remote storage device 26. Thus, while the local storage device 24 is accumulating writes from the host 22 that are assigned sequence number N, the writes that occurred for the previous sequence number (N−1) are transmitted by the local storage device 24 to the remote storage device 26 via the link 29. A chunk 64 represents writes from the host 22 that were assigned the sequence number N−1 that have not been transmitted yet to the remote storage device 26.

The remote storage device 26 receives the data from the chunk 64 corresponding to writes assigned a sequence number N−1 and constructs a new chunk 66 of host writes having sequence number N−1. The data may be transmitted using appropriate RDF protocol that acknowledges data sent across the link 29. When the remote storage device 26 has received all of the data from the chunk 64, the local storage device 24 sends a commit message to the remote storage device 26 to commit all the data assigned the N−1 sequence number corresponding to the chunk 66. Generally, once a chunk corresponding to a particular sequence number is committed, that chunk may be written to the logical storage device. This is illustrated with a chunk 68 corresponding to writes assigned sequence number N−2 (i.e., two before the current sequence number being used in connection with writes by the host 22 to the local storage device 26). The chunk 68 is shown as being written to a data element 62 representing disk storage for the remote storage device 26. Thus, the remote storage device 26 is receiving and accumulating the chunk 66 corresponding to sequence number N−1 while the chunk 68 corresponding to the previous sequence number (N−2) is being written to disk storage of the remote storage device 26 illustrated by the data element 69. In some embodiments, the data for the chunk 68 is marked for write (but not necessarily written immediately), while the data for the chunk 66 is not.

Thus, in operation, the host 22 writes data to the local storage device 24 that is stored locally in the data element 61 and is accumulated in the chunk 62. Once all of the data for a particular sequence number has been accumulated, the local storage device 24 increments the sequence number. Data from the chunk 64 corresponding to one less than the current sequence number is transferred from the local storage device 24 to the remote storage device 26 via the link 29. The chunk 68 corresponds to data for a sequence number that was committed by the local storage device 24 sending a message to the remote storage device 26. Data from the chunk 68 is written to disk storage of the remote storage device 26.

Note that the writes within a particular one of the chunks 62, 64, 66, 68 may or may not be ordered in accordance with various embodiments of the system described herein. However, every write for the chunk 68 corresponding to sequence number N−2 was begun prior to beginning any of the writes for the chunks 64, 66 corresponding to sequence number N−1. In addition, every write for the chunks 64, 66 corresponding to sequence number N−1 was begun prior to beginning any of the writes for the chunk 62 corresponding to sequence number N. Thus, in the event of a communication failure between the local storage device 24 and the remote storage device 26, the remote storage device 26 may simply finish writing the last committed chunk of data (for example, the chunk 68) and can be assured that the state of the data at the remote storage device 26 is ordered in the sense that the data element 69 contains all of the writes that were begun prior to a certain point in time and contains no writes that were begun after that point in time. Thus, R2 may always contains a point in time copy of R1 and it is possible to reestablish a consistent image from the R2 device.

According to an embodiment of the system described herein, a host based active/active model may be used for data replication. Using a host based replication model, the host may create, and/or otherwise control the transfer or migration of, duplicate synchronous copies of data to multiple local storage devices. Thereafter, the local storage devices may use remote data replication facilities (e.g., SRDF/A features) to remotely replicate data to a remote mirror device. The system described herein may be used in connection with data mirroring processes and data migration processes, including the use of data encryption processes in connection with data mirroring or migration. Reference is made, for example, to U.S. Pat. No. 6,954,835 to Lecrone et al., entitled "Intercepting Control of a Host I/O Process," U.S. Pat. No. 7,685,129 to LeCrone et al., entitled "Dynamic Data Set Migration," and U.S. Pat. No. 7,707,186 to LeCrone et al., entitled "Method and Apparatus for Data Set Migration," which are all incorporated herein by reference.

Figure 4:
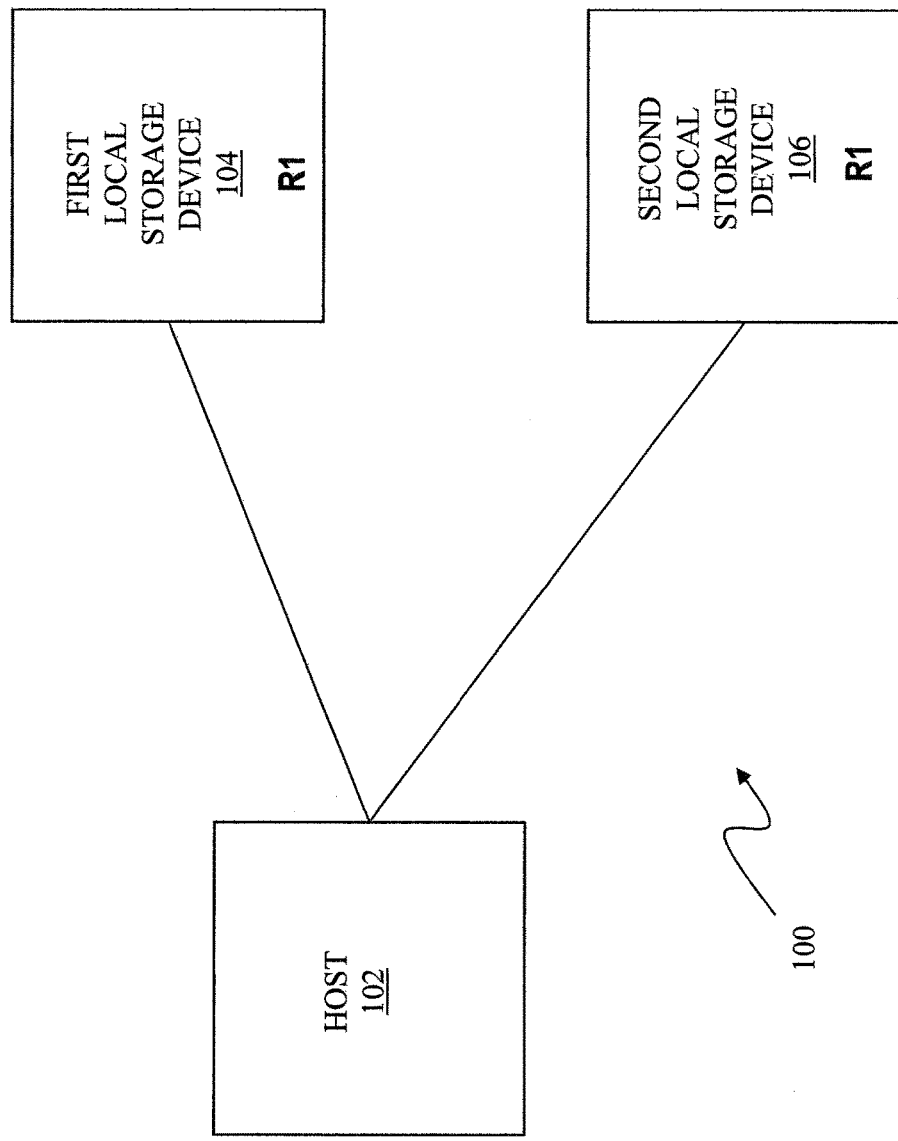
FIG. 4 is a schematic diagram showing a host coupled to two local storage devices according to an embodiment of the system described herein.

FIG. 4 is a schematic diagram illustrating a system 100 that includes a host 102, a first local storage device (R1) 104, and a second local storage device (R1) 106. In an embodiment, the devices 104, 106 may each be R1 volumes of a four site replication system, as further discussed elsewhere herein, that provides enhanced disaster recovery and data accessibility features. The host 102 may communicate with both the first primary device 104 and the second primary device 106, including read/write access to the devices 104, 106. In an embodiment herein, the first and second primary devices 104, 106 may each represent local storage devices that are in relatively close proximity to the host 102 to allow for synchronous data mirroring of the local data copies at the devices 104, 106 using the host 102. In an embodiment, the host 102 may include EMC Corporation's z/OS Migrator product that provides a host-based application for performing data migration processes and data mirroring processes among storage devices, including EMC Symmetrix and/or other devices.

The host 102 may further include a mechanism that conveys that the devices 104, 106 are to contain identical copies of data generated, and/or otherwise transmitted, by the host 102. Specifically, the data migration and data mirroring functionality of the host 102, e.g. via z/OS Migrator, may be used to provide synchronous copies of data on the first local device 104 and the second local device 106. The host 102 may be informed that, for example, where the first local device 104 is to be considered a source device, the second local device 106 may be considered a target device that is to be the same as the source device.

According to the system described herein, the host 102 may create, and/or otherwise control the transfer or migration of, duplicate synchronous copies of data on the first and second primary devices 104, 106 as local storage systems. Specifically, instead of requiring a data transfer link, such as synchronous SRDF link (SRDF/S), between the R1 volumes of a four site replication system to provide synchronous local data copies between the R1 volumes for replication to respective R2 volumes, the host 102 controls the creation of the duplicate synchronous copies among the R1 volumes (first and second local storage devices 104, 106). The system 100 provides an active/active storage model in which one or more hosts, including host 102, may perform I/O read/write accesses on either of devices 104, 106, with the host 102 controlling the synchronization of the local data copies between the devices 104, 106.

With a host-based replication model according to the system described herein, read I/O's may be balanced across the local copies of the data on the devices 104, 106. Additionally, the system described herein enables delayed write between the write I/O's as along as one of the primary devices has accepted/completed the write. Other advantages of having the host control the synchronous replication include data logging on a source failure, fast remote resynchronization, no delay consistent copies across many (e.g., thousands) of devices, improved replication method capability and/or alternate subchannel set expanded devices count exploitation, for example. The system described herein further advantageously reduces or eliminates the need for various complexities, such as additional software components, of known four site replication systems, including, for example, eliminating a need for autoswap and consistency groups.

Figure 5:
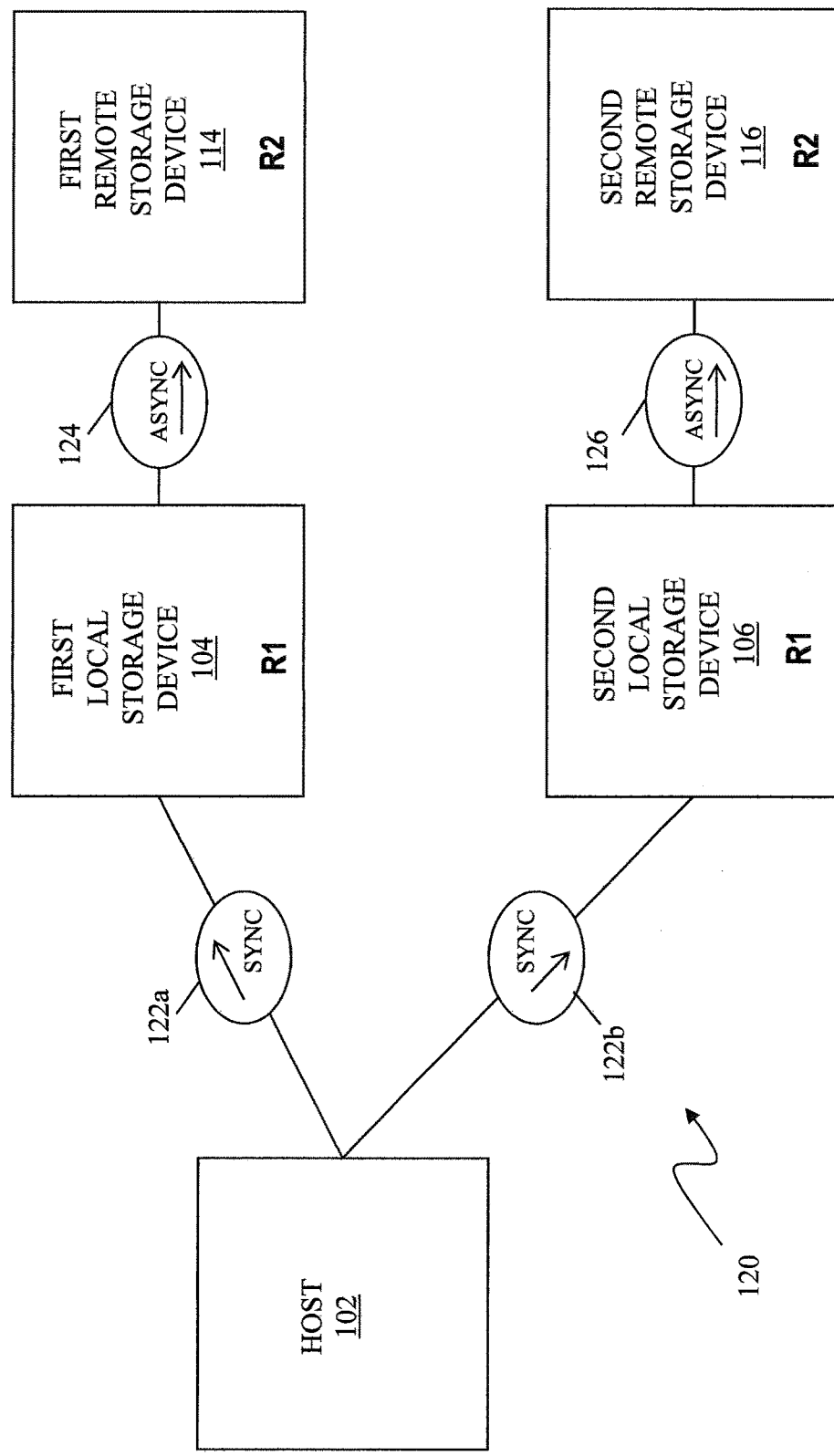
FIG. 5 is schematic illustration showing a four site replication system according to an embodiment of the system described herein.

FIG. 5 is schematic illustration showing a four site replication system 120 according to an embodiment of the system described herein. In an embodiment, the asynchronous replication functionality may be provided by an SRDF/A product from EMC Corporation. The four site replication system 150 may include the host 102, first local storage device 104 and second local storage device 106, acting as R1 devices as previously described. As illustrated, the devices 104, 106 may be coupled via data links 124, 126, respectively, to a first remote storage device 114 and a second remote storage device 116, acting as R2 devices. According to an embodiment of the system described herein, after the host 102 has created synchronous local copies of data on the devices 104, 106, shown by synchronous data transfer links 122a, 122b, remote replication functionality may be performed to asynchronously transfer copies of the data to the remote storage devices 114, 116, shown by the asynchronous data transfer links 124, 126. In other embodiments, where appropriate, it is noted that the data transfer links 124, 126 may be synchronous data transfer links and data between transferred synchronously between the local and remote storage devices. Accordingly, the system described herein efficiently provides four site replication processing for disaster recovery and assured data accessibility in accordance with the advantages of the system described herein.

The remote devices 114, 116 may represent a storage device and/or a plurality of storage devices at a location that is geographically distant from the local devices 104, 106. For example, the remote devices 114, 116 may represent a storage device or group of storage devices on the west coast of the United States while the local devices 104, 106 are located on the east coast of the United States. Because of the relatively large geographic distance between the local devices 104, 106 and the remote devices 114, 116 206, it may be impractical to use a synchronous data transfer mode to mirror data on the remote devices 114, 116 from the local devices 104, 106, which provides for acknowledgment of data at the remote devices 114, 116 prior to acknowledging a write to the host 102 of the local devices 104, 106. In such instances, asynchronous transfers may be performed according to the system described herein. Accordingly, in various embodiments, the host 102 may create, and/or otherwise control the transfer or migration of, synchronous data copies between the local devices 104, 106 and the data asynchronously copied to the remote storage devices 114, 116.

Figure 6:
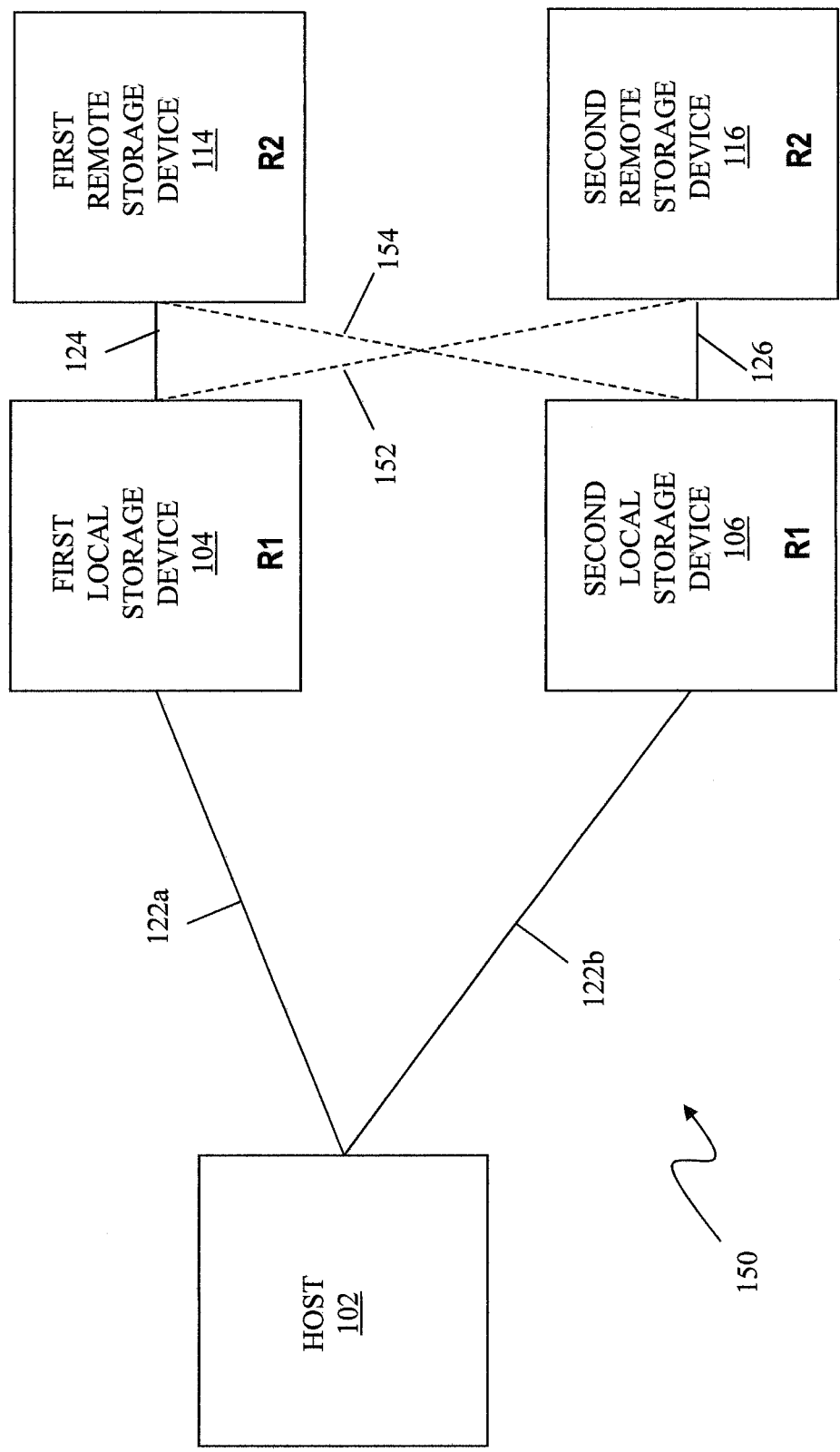
FIG. 6 is a schematic illustration showing a four site replication system further showing other possible links between the local devices and the remote devices.

FIG. 6 is a schematic illustration showing a four site replication system 150, like the system 120 discussed elsewhere herein, but further showing other possible links 151, 152 between the local devices 104, 106 and the remote devices 114, 116. For example, the local device 104 may be linked to the remote device 114 and/or to the remote device 116. It is noted that host-based replication system described herein may be flexibly and advantageously used in accordance with customer requirements to provide four site replication processing according to a multiple system architectures and configurations.

Figure 7:
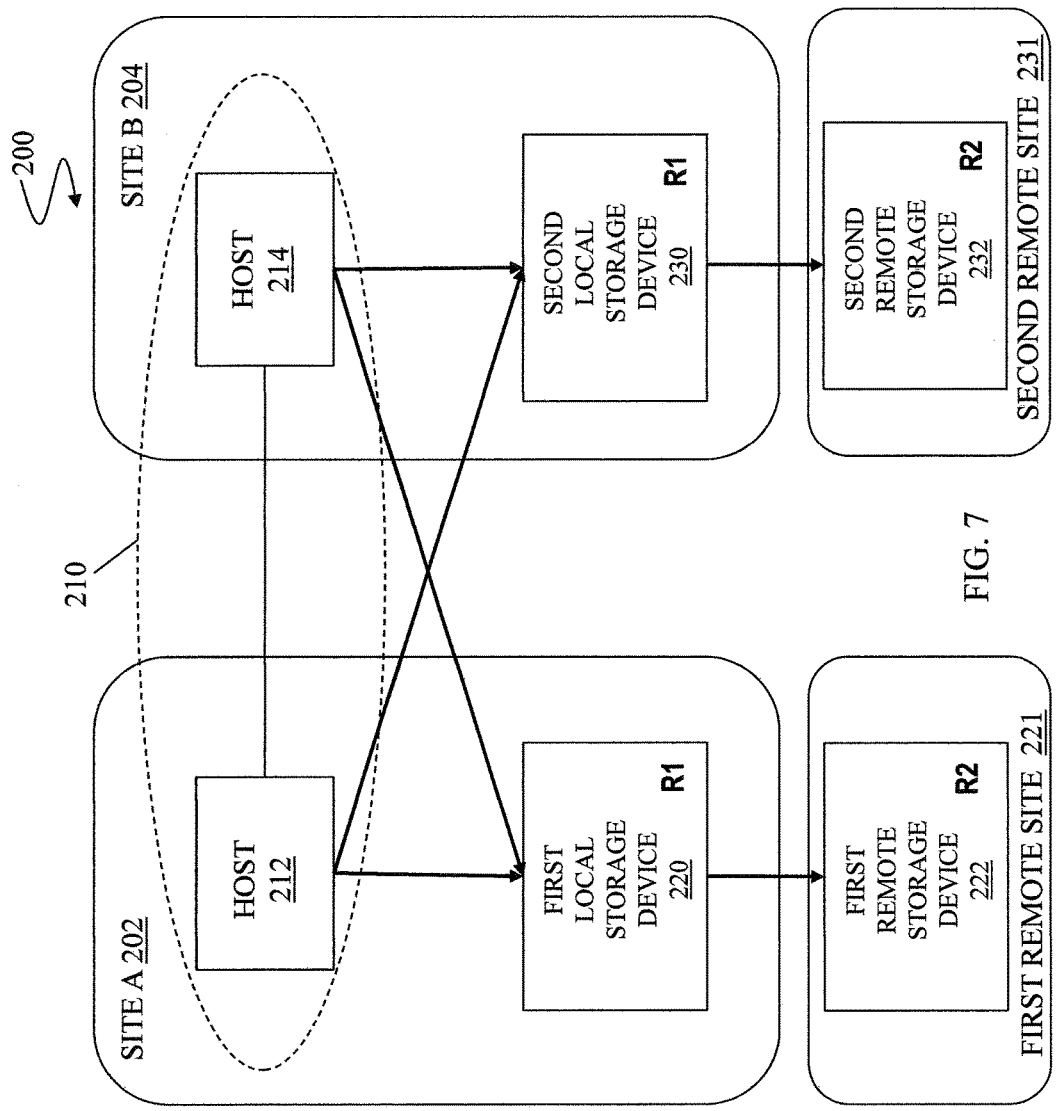
FIG. 7 is a schematic illustration of a more detailed view of a four site replication system according to an embodiment of the system described herein.

FIG. 7 is a schematic illustration of a more detailed view of a four site replication system 200 according to an embodiment of the system described herein. The system 200 may include a Site A 202 and a Site B 204. The Site A 202 and Site B 204 may be different sites, but may not necessarily be located geographically distant from each other. A first local storage device 220 is provided at Site A 202 and a second local storage device is provided at Site B 204. A plurality of hosts 212, 214 may be coupled to the first local storage device 220 and the second local storage device 230 to conduct read and write operations from and to the local storage devices 220, 230. The system 200 provides for remote mirroring where multiple storage volumes, e.g., a first local storage device 220 and a second local storage device 230, may be active at the same time. In various embodiments, the plurality of hosts 212, 214 may be coupled to the storage devices 220, 230 directly and/or via a network, such as the Internet, an intranet and/or other suitable network connection. The hosts 212, 214 may be part of a cluster 210, which may be formed by a group of hosts and/or applications connected together, for example, via a local area network and/or other network. In various embodiments, the first and second local storage devices 220, 230 may be separate devices, volumes, and/or portions thereof. The devices may include physical devices and/or logical volumes, for example, identified as Logical Unit Numbers (LUNs).

A first remote site 221 may include a first remote storage device 222 (R2) that may be coupled via an asynchronous data transfer link to the first local storage device 220 (R1) on Site A 202. A second remote site 231 may include a second remote storage device 232 (R2) that is coupled via an asynchronous data transfer link to the second local storage device 230 (R1) on Site B 204. One or more of the hosts 212, 214 may control the synchronization of local data copies across the first local storage device 220 and the second local storage device 230. Thereafter, data from each of the first local storage device 220 and the second local storage device 230 may be asynchronously transferred to the respective remote storage devices 222, 232 of the first and second remote sites 221, 231, as further discussed elsewhere herein. It is further noted that, as discussed elsewhere herein, embodiments of the system described herein may be provided in which there are synchronous data transfer links between the local and remote storage devices, where appropriate. The system described herein thereby advantageously provides for four site data replication using a host based active/active model.

Figure 8:
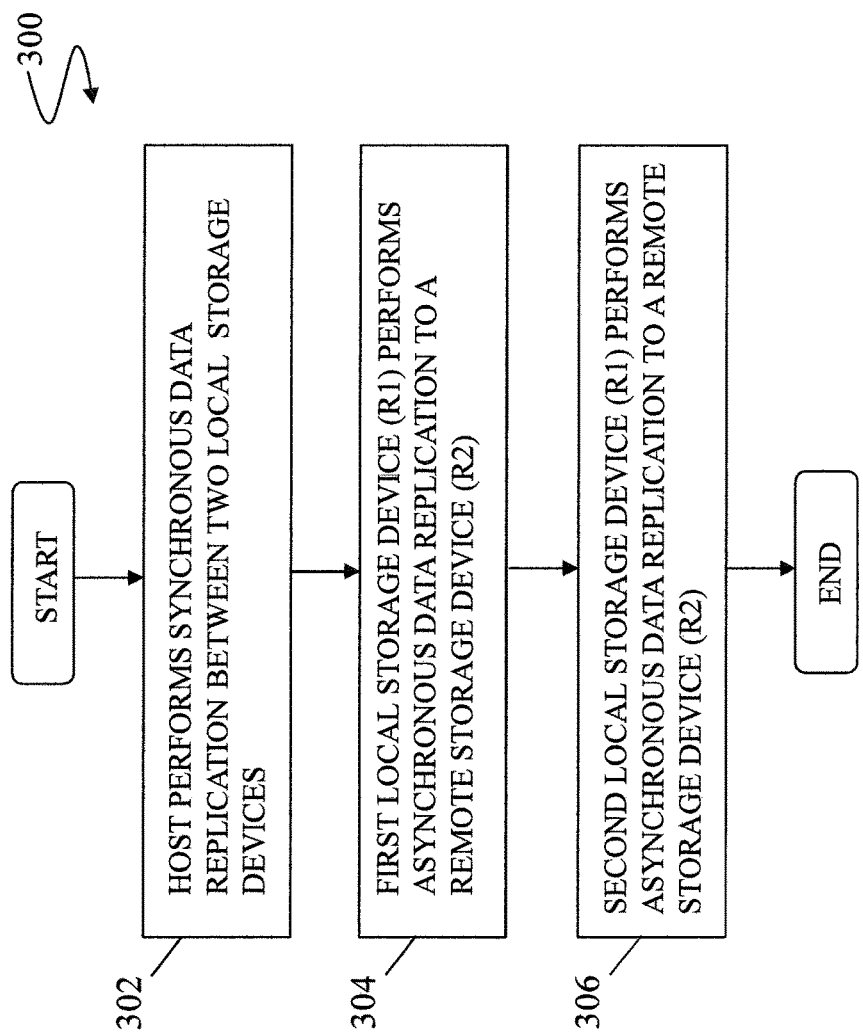
FIG. 8 is a flow diagram showing data replication processing for a four site active/active model system according to an embodiment of the system described herein.

FIG. 8 is a flow diagram 300 showing data replication processing for a four site active/active model system according to an embodiment of the system described herein. At a step 302, a host synchronously replicates data between at least two local storage devices. In various embodiments, the host may generate the data that is to be synchronously replicated and/or may access data of one of the storage devices and synchronously replicate that data to the other of the two storage devices. In an embodiment, the host may include z/OS Migrator software from EMC Corporation and the processing may include the z/OS Migrator mirroring data from one of the two local storage devices to the other of the two local storage devices. After the step 302, processing proceeds to a step 304 where the data on one of the two storage devices (R1 devices), that has been synchronously replicated via the host, is asynchronously replicated to one or more remote storage devices (R2 devices). After the step 304, processing proceeds to a step 306, where data on the other of the two storage devices, that has been synchronously replicated via the host, is asynchronously replicated to one or more remote storage devices. After the step 306, processing is complete.

In various embodiments, it is noted that the asynchronous transfers of the steps 304 and 306 may be performed concurrently and/or in a different order. As provided by the system described herein, the asynchronous transfers from each of the R1 storage devices to the R2 devices may be performed at different times or speeds. Accordingly, it is noted that the system may various advantages, including, for example, allowing delayed writes between the write I/Os as long as one of the R1 devices has accepted/completed the write. It is further noted that, as further discussed elsewhere herein, in other embodiments, the data transfer in step 306 may instead be a synchronous data transfer, where appropriate.

It is further noted that the one or more remote storage devices (R2 devices) may include separate devices remotely located to provide four site replication for disaster recovery. In other embodiments, a common remote storage device may be used and/or each of the storage devices may act as remote storage devices (R2) for the other storage device (R1), as further discussed elsewhere herein. In an embodiment, the asynchronous replication may be performed using an SDRF/A product from EMC Corporation.

Figure 9:
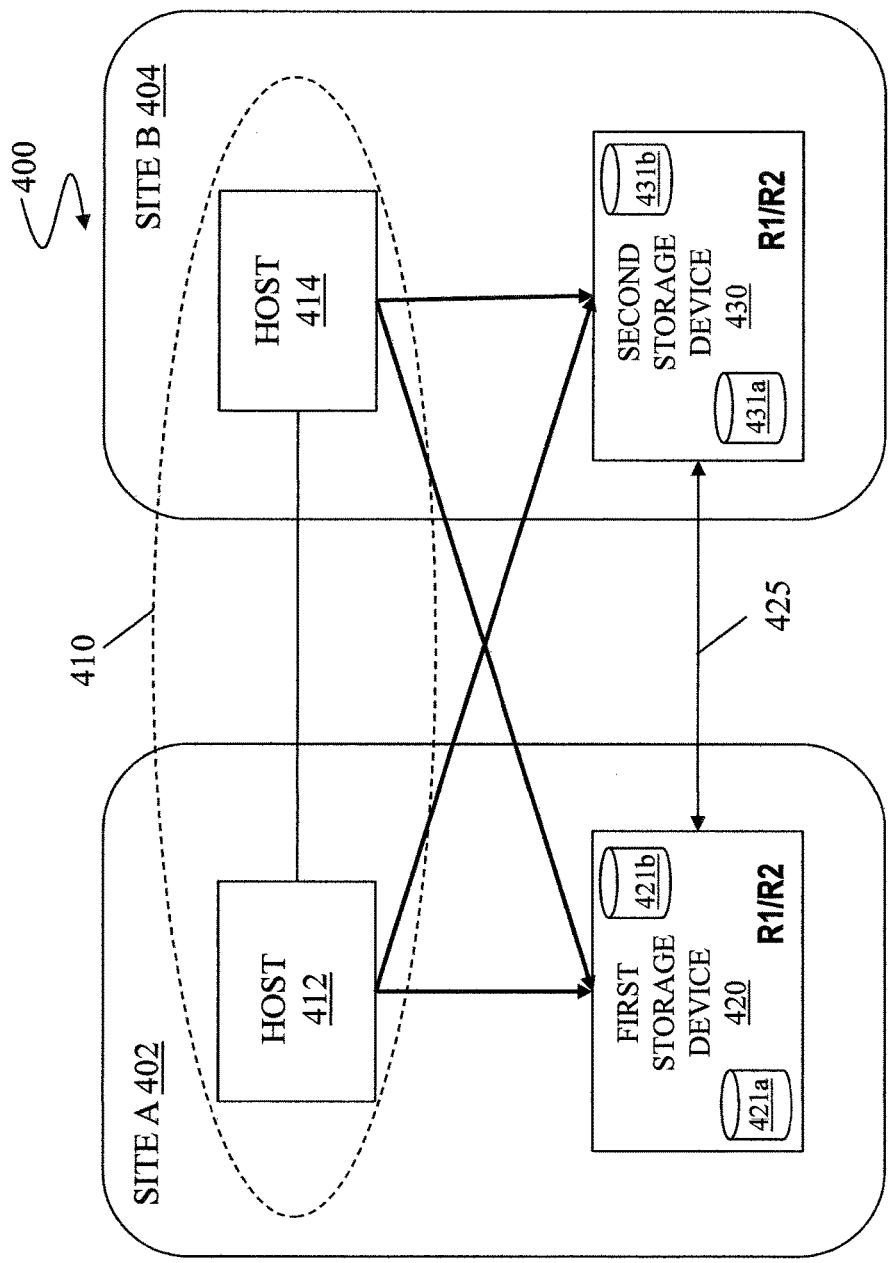
FIG. 9 is a schematic illustration showing another embodiment for multiple site replication system using a host based active/active model according to the system described herein.

FIG. 9 is a schematic illustration showing another embodiment for multiple site replication system 400 using a host based active/active model according to the system described herein. In the illustrated embodiment, a first storage device 420 is provided in a Site A 402 and a second storage device 430 is provided in a Site B 404. The hosts 412, 414 may be part of a cluster 410, which may be formed by a group of hosts and/or applications connected together, for example, via a local area network and/or other network. The first and second local storage devices 420, 430 may each include multiple storage volumes, shown as volumes 421*a, b*, in storage device 420 and volumes 431*a,b*, in storage device 430. A plurality of hosts 420, 430 may be coupled to the first local storage device 420 and the second local storage device 430 to conduct read and write operations from and to the local storage devices 420, 430.

A communication path 425 may also exist between the first storage device 420 and the second storage device 430. The communication link 425 may be used so that the second storage device 430 is a mirror of the first storage device 420 (and vice versa). Specifically, each of the devices 420, 430 may be R1 devices that may respectively act as a mirrored R2 devices for the other device according to various embodiments of the system described herein involving active/active operations. This is illustrated as R1/R2. Each of the devices 420, 430 may correspond to multiple types of storage, shown by the different storage units 421*a*, 421*b* on the device 420 and the different storage units 431*b*, 431*b* on the device 430. Accordingly, the synchronous data copies from at least one of the hosts 412, 414 may be stored in the storage units 421*a* and 431*a*, of the devices 420, 430, respectively, whereas the asynchronous data transfer between the devices 420, 430 may be stored in the storage units 421*b* and 431*b*. The storage units 421*a,b* and 431*a,b* may be different portions of one storage unit (e.g., different portions of one storage volume) and/or may be represent different types of storage of the storage devices 420, 430. For example, the storage units 421*a,b* and 431*a,b*, may be storage having different access speeds. In other embodiments, the features of the system 400 may further be used in addition to other embodiments described herein to provide further replication at additional remote sites (e.g., four site replication).

Figure 10:
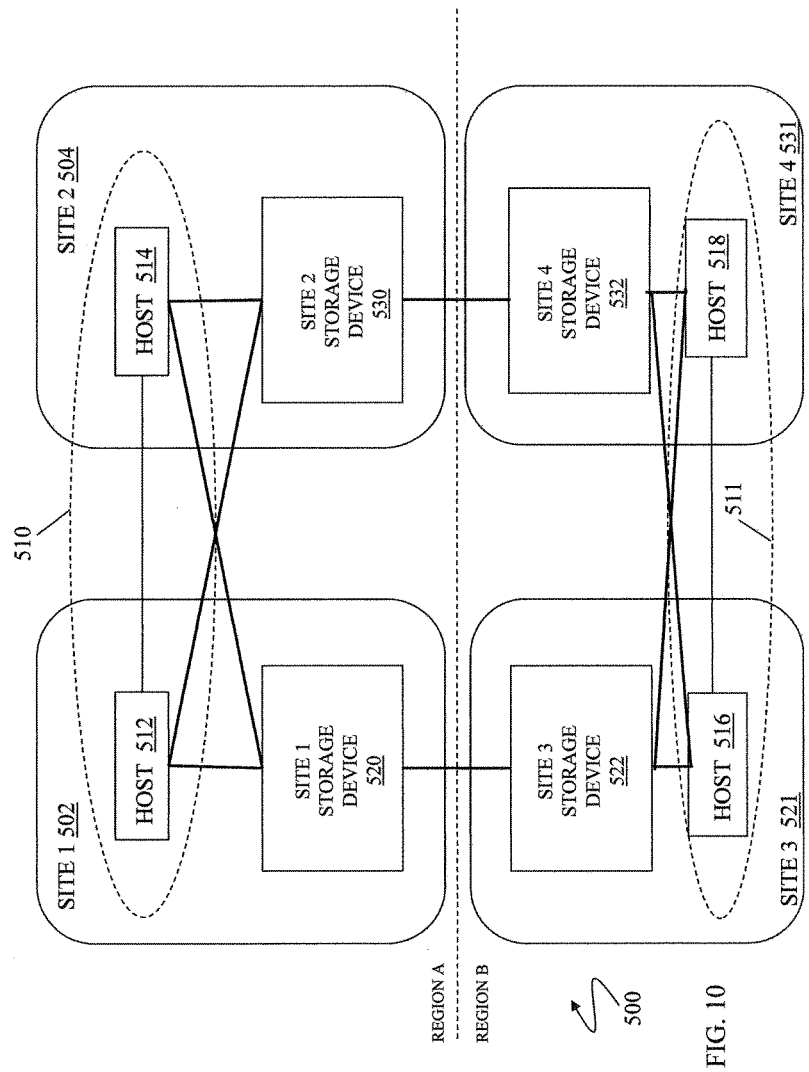
FIG. 10 is a schematic illustration showing a four site replication system according to an embodiment of the system described in connection with sites disposed among multiple regions.

FIG. 10 is a schematic illustration showing a four site replication system 500 according to an embodiment of the system described in connection with sites disposed among multiple regions. Elements and operation of the system 500 may be similar to that described in connection with FIG. 7, but with additional modifications and features as discussed below. In FIG. 10, the connections and/or couplings of the elements are shown. Data flow operations, according to various operational embodiments, are further discussed elsewhere herein (see FIGS. 11A-11F). In the illustrated embodiment, the system 500 may include a Site 1 502 and a Site 2 504 that may be located in a same Region A (e.g., a particular geographical region, such as Germany). A Site 1 storage device 520 is provided local to Site 1 502 and a Site 1 storage device 530 device is provided local to Site 2 504. A plurality of hosts 512, 514 may be coupled to the Site 1 storage device 520 and the Site 2 storage device 530 to conduct read and write operations from and to the local storage devices 520, 530, as further discussed herein (see FIGS. 11A-11F). In various embodiments, the plurality of hosts 512, 514 may be coupled to the storage devices 520, 530 directly and/or via a network, such as the Internet, an intranet and/or other suitable network connection. The hosts 512, 514 may be part of a cluster 510, which may be formed by a group of hosts and/or applications connected together, for example, via a local area network and/or other network.

In another Region B (e.g., another particular geographical region, such as France), a Site 3 521 may be provided that includes a Site 3 storage device 522 (R2) that may be coupled via an asynchronous data transfer link and/or synchronous data transfer link to the Site 1 storage device 520 (R1) on Site 1 502. A Site 4 531 may be provided that includes a Site 4 storage device 532 (R2) that is coupled via an asynchronous data transfer link and/or synchronous data transfer link to the Site 2 storage device 530 (R1) on Site 2 504. A plurality of hosts 516, 518 are shown, that may be part of a cluster 511, on the Sites 3 and 4 521, 531. It is noted that, in various embodiments, the transfers from the local storage devices (e.g., storage devices 520, 530) to the remote storage devices (e.g., storage devices 521, 531) may be controlled by the storage devices and/or may, in appropriate circumstances, be controlled by one of more of the hosts 502, 504.

Figure 11A:
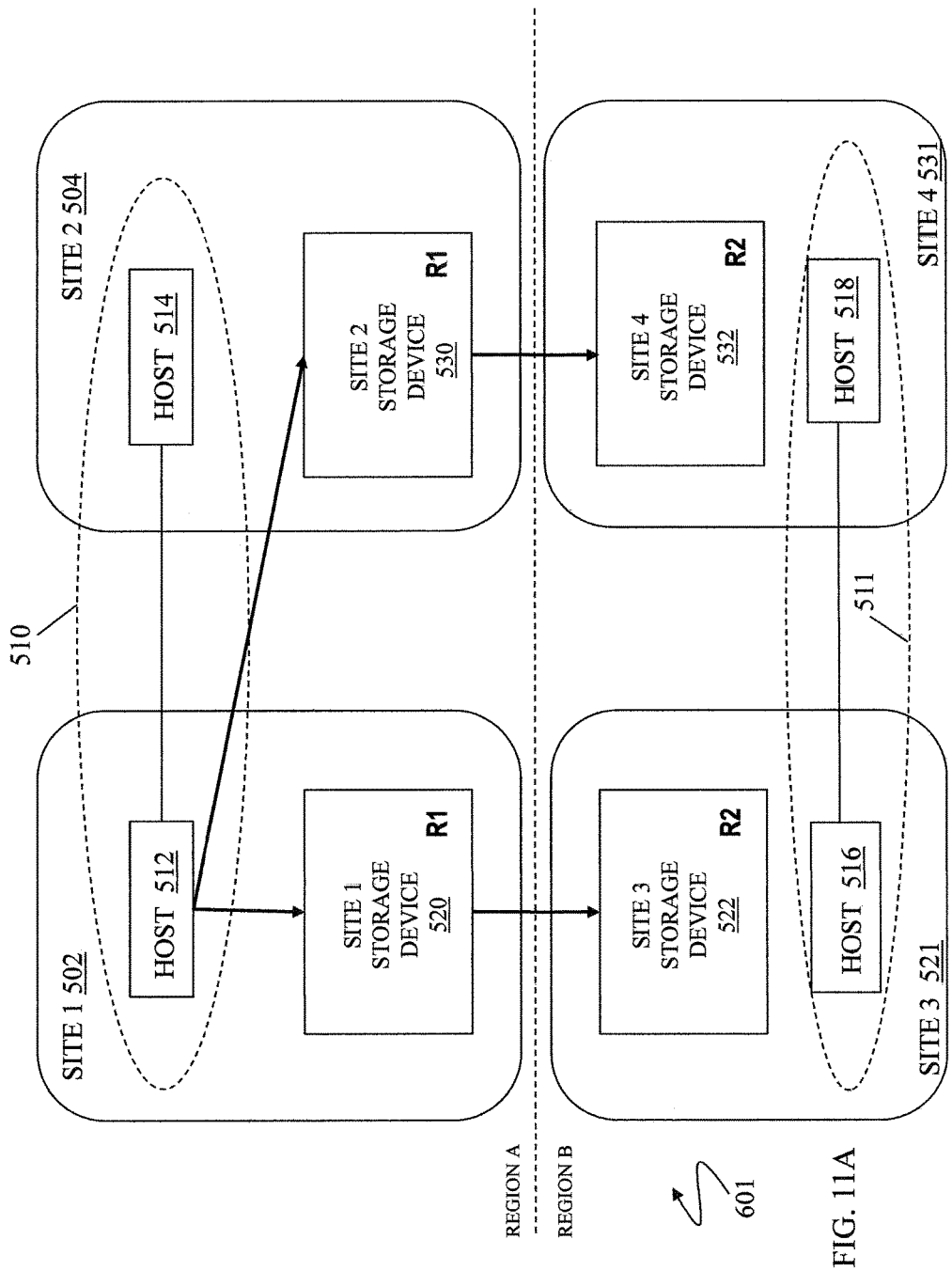
FIGS. 11A-11F are schematic illustrations showing various operational embodiment permutations for data flow operations of a system like that shown in FIG. 10.
Figure 11B:
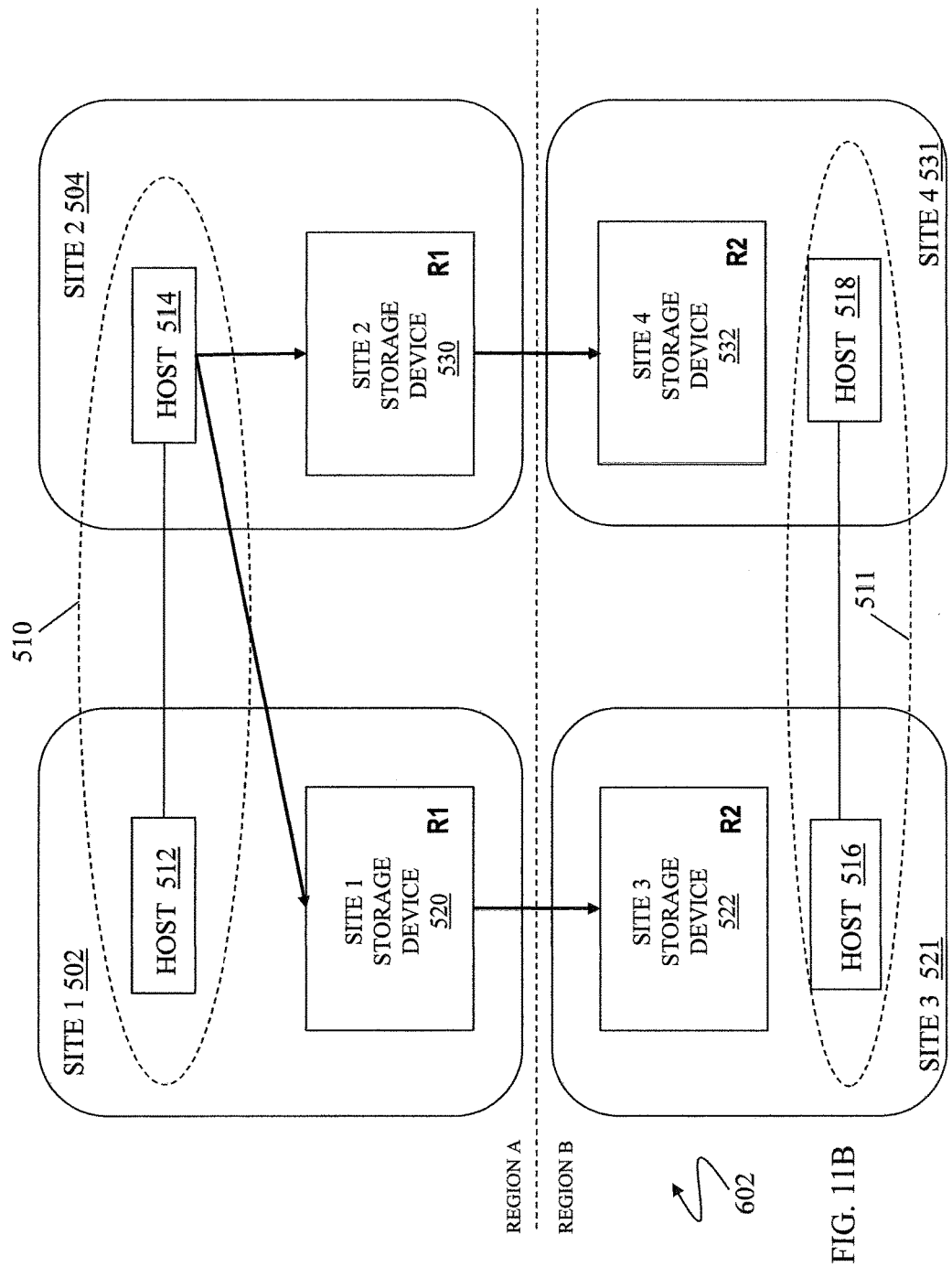
Figure 11C:
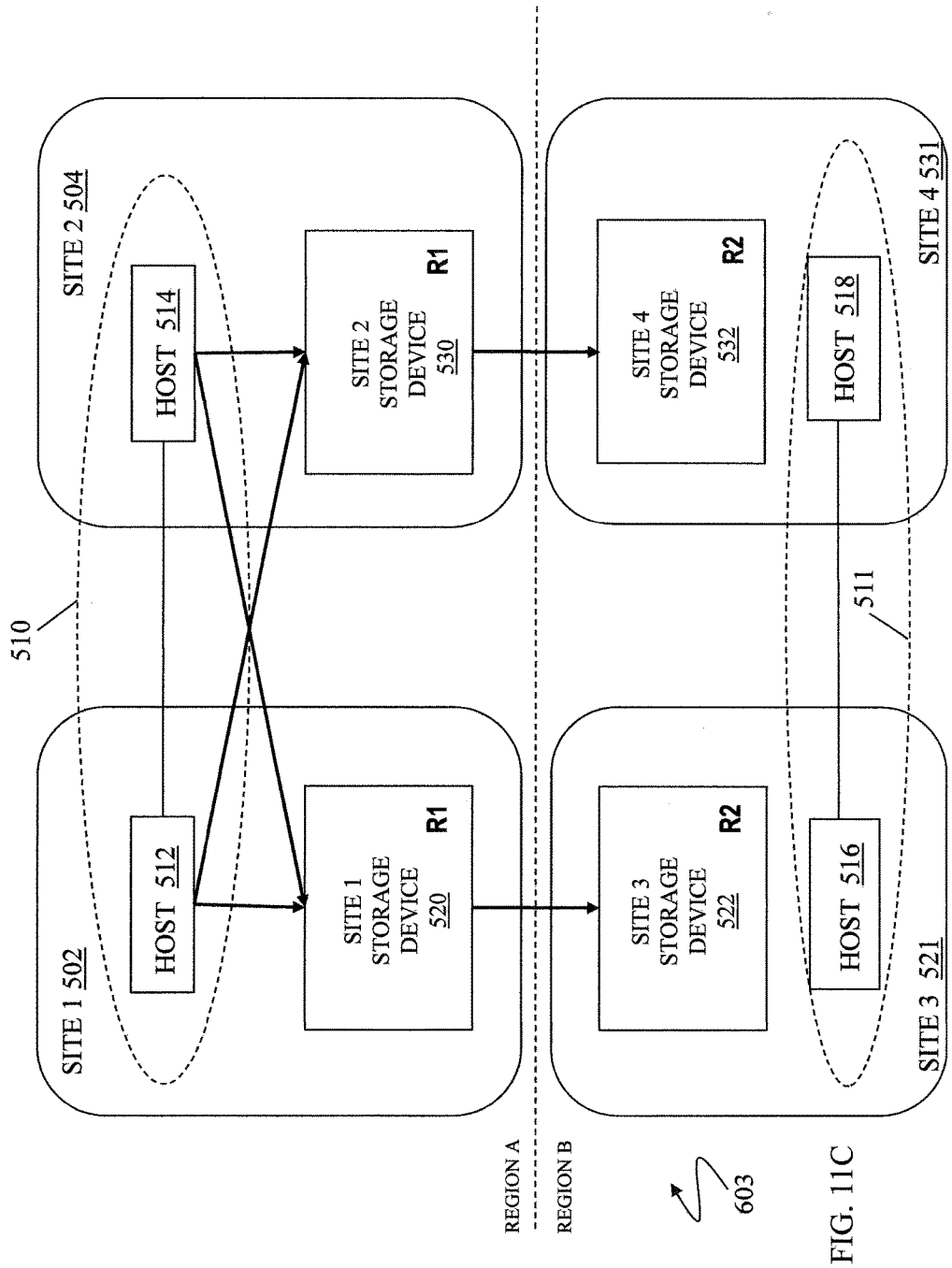
Figure 11D:
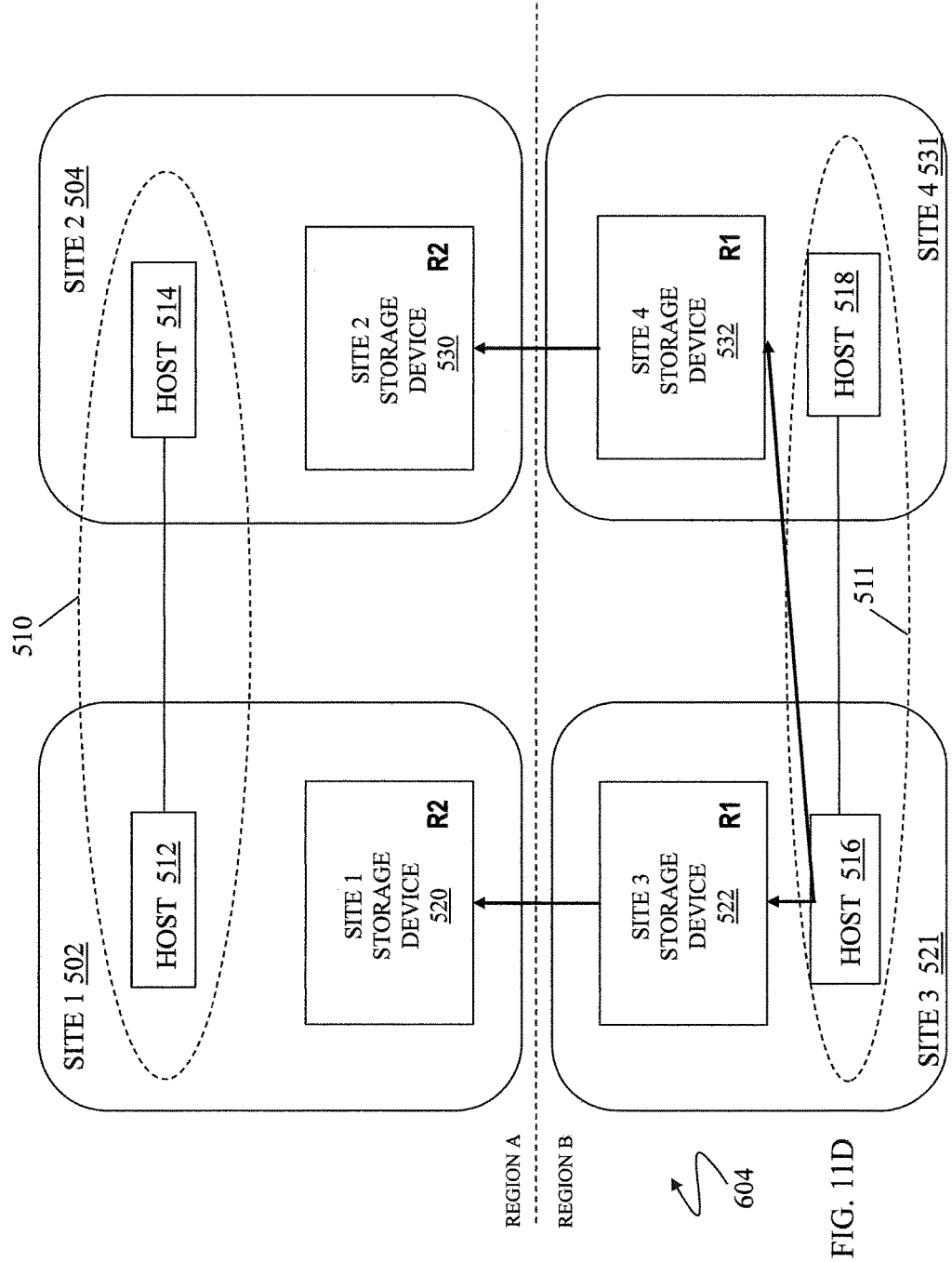
Figure 11E:
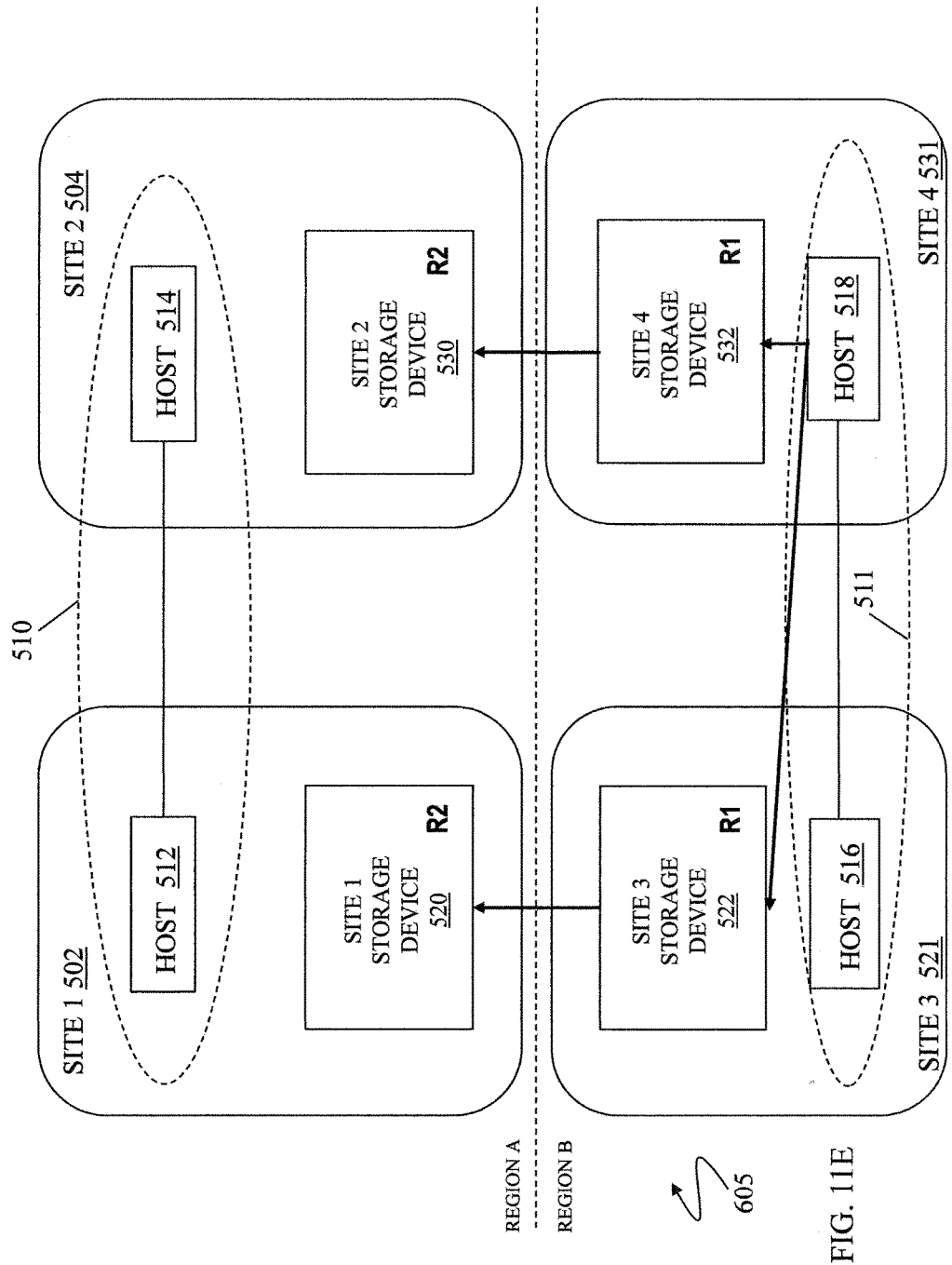
Figure 11F:
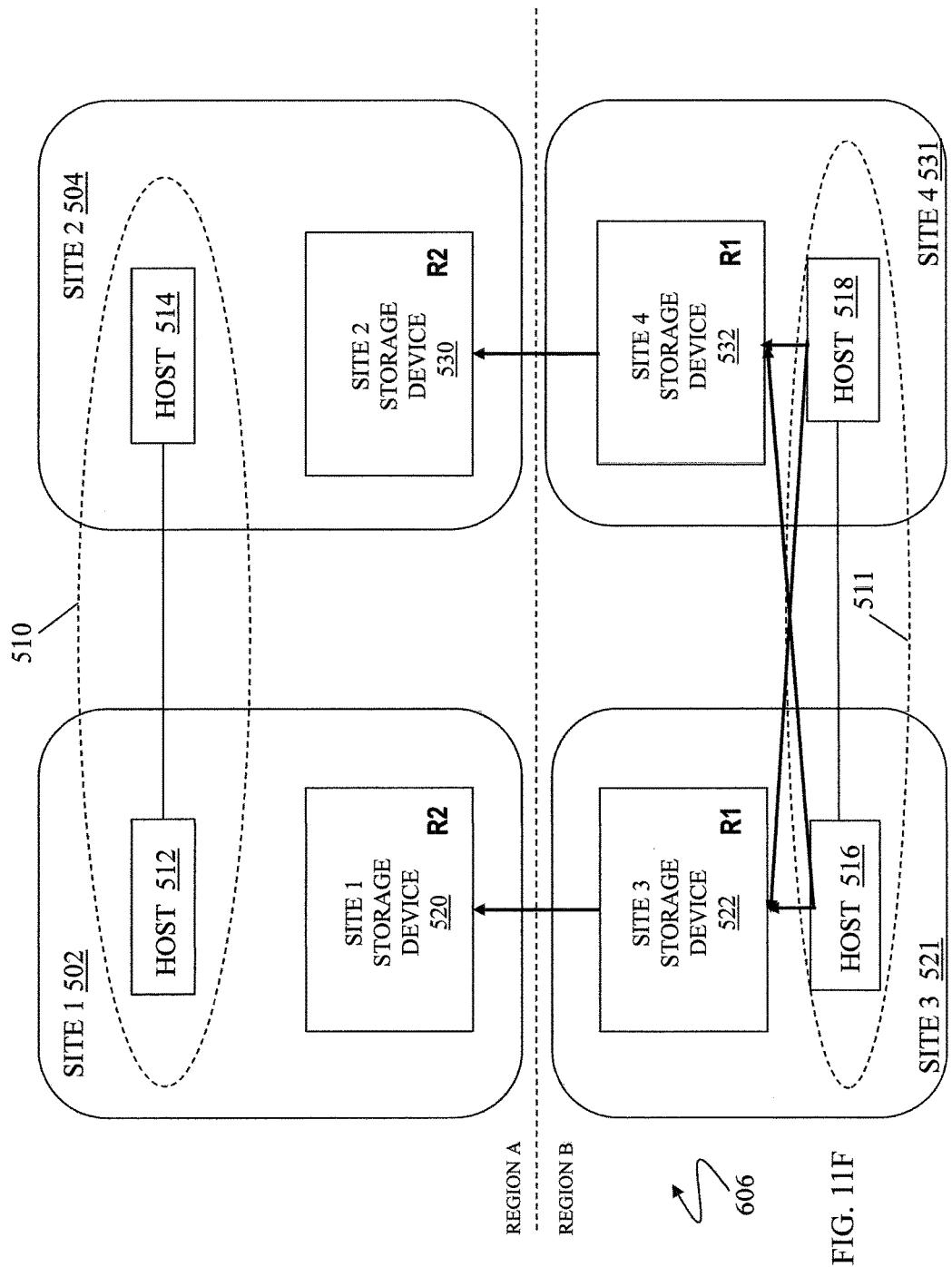

FIGS. 11A-11F are schematic illustrations showing various operational permutations for data flow operations of a system 500 like that shown in FIG. 10. In FIGS. 11A-11C, the sites of Region A are controlling operations according to various embodiments. FIGS. 11D-11F show embodiments for data flow operations performed after a swap of control to the sites of Region B, such as may be performed in the event of disaster in Region A.

The specific embodiments shown in FIGS. 11A-11C will now be described in more detail.

In FIG. 11A, a schematic illustration 601 is shown of a first embodiment of data flow operations according to the system described herein in which the host 512 at Site 1 502 is controlling the synchronous data replications to the storage devices 520, 530 (R1 devices) at the Sites 1 and 2 502, 504. Data transfers may then be performed, respectively, from the storage devices 520, 530 at the Sites 1 and 2 502, 504 in Region A to the storage devices 522, 532 (R2 devices) of the Sites 3 and 4 521, 531 in Region B, in a manner as further discussed elsewhere herein. It is noted that the hosts 516, 518 of the Sites 3 and 4 521, 531 are not performing data operations in this embodiment; the Sites 3 and 4 521, 531 are passively receiving data.

In FIG. 11B, a schematic illustration 602 is shown of a second embodiment of data flow operations according to the system described herein in which the host 514 at Site 2 504 is controlling the synchronous data replications to the storage devices 520, 530 (R1 devices) at the Sites 1 and 2 502, 504. Data transfers may then be performed, respectively, from the storage devices 520, 530 at the Sites 1 and 2 502, 504 in Region A to the storage devices 522, 532 (R2 devices) of the Sites 3 and 4 521, 531 in Region B, in a manner as further discussed elsewhere herein. It is noted that the hosts 516, 518 of the Sites 3 and 4 521, 531 are not performing data operations in this embodiment; the Sites 3 and 4 521, 531 are passively receiving data.

In FIG. 11C, a schematic illustration 603 is shown of a third embodiment of data flow operations according to the system described herein in which both of the hosts 512, 514 may control the synchronization of local data copies across the Site 1 storage device 520 and the Site 2 storage device 530 (R1 devices) in an active/active configuration as discussed elsewhere herein. Thereafter, data from each of the Site 1 storage device 520 and the Site 2 storage device 530 may be transferred to the respective storage devices 522, 532 (R2 devices) of the Sites 3 and 4 521, 531, in a manner as further discussed elsewhere herein. It is noted that the hosts 516, 518 of the Sites 3 and 4 521, 531 are not performing data operations in this embodiment; the Sites 3 and 4 521, 531 are passively receiving data.

FIGS. 11D-11F show embodiments of data flow operations of the system described herein following a swap of operational control from the sites of Region A to the sites of Region B, for example, as a result of a disaster in Region A affecting Sites 1 and 2 512, 514 and in which one or more of the hosts 516, 518 of the Sites 3 and 4 521, 531 may now perform operations that were formerly performed by the hosts 512, 514 of the Sites 1 and 2 512, 514 of Region A, The Site 1 and Site 2 storage devices 520, 530 may now serve as R2 devices while the Site 3 and Site 4 storage devices 521, 531 may now serve as R1 devices according to various embodiments of operation of the system described herein. The hosts 512, 514 no longer perform storage operations with respect to any of the storage devices 520, 530, 522, 532, and the Site 1 and Site 2 storage devices 520, 530 may now be passively receiving data from the Sites 3 and 4 521, 531. Accordingly, the system described herein, using the host-based synchronization of data as described herein, enables and an advantageous and efficient swap of operational control between the sites of Region A and the sites of Region B, for example, in connection with disaster recovery in response to a disaster at Region A. In this manner, data is protected and replication operations may still continue in response to a disaster.

The specific embodiments shown in FIGS. 11D-11F will now be described in more detail.

In FIG. 11D, a schematic illustration 604 is shown of a fourth embodiment of data flow operations according to the system described herein in which the host 516 at Site 3 521 is controlling the synchronous data replications to the storage devices 522, 532 (R1 devices) at the Sites 3 and 4 521, 531. Data transfers may then be performed, respectively, from the storage devices 522, 532 at the Sites 3 and 4 521, 531 in Region B to the storage devices 520, 530 (R2 devices) of the Sites 1 and 2 502, 504 in Region A, in a manner as further discussed elsewhere herein. It is noted that the hosts 512, 514 of the Sites 1 and 2 502, 504 are not performing data operations in this embodiment; the Sites 1 and 2 502, 504 are passively receiving data.

In FIG. 11E, a schematic illustration 605 is shown of a fifth embodiment of data flow operations according to the system described herein in which the host 518 at Site 4 531 is controlling the synchronous data replications to the storage devices 522, 532 (R1 devices) at the Sites 3 and 4 521, 531. Data transfers may then be performed, respectively, from the storage devices 522, 532 at the Sites 3 and 4 521, 531 in Region B to the storage devices 520, 530 (R2 devices) of the Sites 1 and 2 502, 504 in Region A, in a manner as further discussed elsewhere herein. It is noted that the hosts 512, 514 of the Sites 1 and 2 502, 504 are not performing data operations in this embodiment; the Sites 1 and 2 502, 504 are passively receiving data.

In FIG. 11F, a schematic illustration 606 is shown of a sixth embodiment of data flow operations according to the system described herein in which both of the hosts 516, 518 may control the synchronization of local data copies across the Site 3 storage device 522 and the Site 4 storage device 532 (R1 devices) in an active/active configuration as discussed elsewhere herein. Thereafter, data from each of the Site 3 storage device 522 and the Site 4 storage device 532 may be transferred to the respective storage devices 520, 530 (R2 devices) of the Sites 1 and 2 502, 504, in a manner as further discussed elsewhere herein. It is noted that the hosts 512, 514 of the Sites 1 and 2 502, 504 are not performing data operations in this embodiment; the Sites 1 and 2 502, 504 are passively receiving data.

It is noted that, following a swap of control from the sites of Region A to the sites of Region B, the controlling site configurations may, in various embodiments, be the same as, or different from, that of the configuration prior to the swap. For example, in an embodiment, prior to the swap, the system described herein may be operating according to the active/active configuration of FIG. 11C. The swap may then be performed, for example following a disaster in Region A, and, after the swap, the system described herein is operating in the active/active configuration of FIG. 11F. However, in other embodiments, after the swap, the system described herein may instead operate in a configuration like that of FIG. 11D, that is no longer an active/active configuration. Other appropriate swaps among the embodiment permutations shown in FIGS. 11A-11F may be suitably performed in accordance with the system described herein.

It is further noted that although, for example, four sites are shown in connection with the description of FIGS. 10 and 11A-11F, is noted that the system described herein may suitably operate with more (or fewer) than four sites. For example, additional sites may be added in each of the Regions AB and/or each of the illustrated sites may be considered to represent a cluster of sites. Additionally, additional regions may also be provided with additional sites in accordance with the system described herein. It is also noted that each of the sites described herein may have more than one storage device, including possibly many storage devices. Additionally, although the system described herein may use specific designations for units of data for certain purposes (e.g., tracks or chunks), it should be understood that other units of data (including, possibly, variable length units of data) may be appropriate used. This also applies to other data structures and types of data units.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for data replication, comprising:
using a first host to write a first set of data to a first storage device coupled to the first host;
using the first host to replicate the first set of data to a second storage device coupled to the first host, wherein the first host synchronously replicates the first set of data to the second storage device separately from writing the first set of data to the first storage device using a link between the first host and the second storage device that does not include the first storage device;
using a second host to write a second set of data to the second storage device coupled to the second host;
using the second host to replicate the second set of data to the first storage device coupled to the second host, wherein the second host synchronously replicates the second set of data to the first storage device separately from writing the second set of data to the second storage device using a link between the second host and the first storage device that does not include the second storage device; and
replicating the first and the second sets of data from each of the first storage device and the second storage device to at least one other storage device located remotely from the first and second storage devices, wherein the first storage device is located at a different site than the second storage device, and wherein the at least one remote storage device includes a third storage device and a fourth storage device located at different remote sites that receive the first and the second sets of data from the first and second storage devices, respectively, the first and the second sets of data being asynchronously replicated from the first storage device to the third storage device and asynchronously replicated from the second storage device to the fourth storage device, the third storage device and the fourth storage device passively receiving the first and the second sets of data.

2. The method of claim 1, wherein the asynchronous data replication between the first storage device and the at least one other storage device is completed at a different time than the asynchronous data replication between the second storage device and the at least one other storage device.

3. The method of claim 1, further comprising:
swapping operational control from the first and second hosts to at least one other host for the third storage device and the fourth storage device, wherein the at least one other host synchronously replicates data between the third storage device and the fourth storage device, the third storage device and the fourth storage device being coupled to the at least one other host, and wherein the data from the third storage device and the fourth storage device is replicated to the first storage device and the second storage device, respectively.

4. A non-transitory computer readable medium storing software for data replication, the software comprising:
executable code that, using a first host, writes a first set of data to a first storage device coupled to the first host;
executable code that, using the first host, replicates the first set of data to a second storage device coupled to the first host, wherein the first host synchronously replicates the data to the second storage device separately from writing the first set of data to the first storage device using a link between the first host and the second storage device that does not include the first storage device;
executable code that, using a second host, writes a second set of data to the second storage device coupled to the second host;
executable code that, using the second host, replicates the second set of data to the first storage device coupled to the second host, wherein the second host synchronously replicates the second set of data to the first storage device separately from writing the second set of data to the second storage device using a link between the second host and the first storage device that does not include the second storage device; and
executable code that replicates the first and the second sets of data from each of the first storage device and the second storage device to at least one other storage device located remotely from the first and second storage devices, wherein the first storage device is located at a different site than the second storage device, and wherein the at least one other storage device includes a third storage device and a fourth storage device located at different remote sites that receive the first and the second sets of data from the first and second storage devices, respectively, the first and the second sets of data being asynchronously replicated from the first storage device to the third storage device and asynchronously replicated from the second storage device to the fourth storage device, the third storage device and the fourth storage device passively receiving the first and the second sets of data.

5. The non-transitory computer readable medium of claim 4, wherein the asynchronous data replication between the first storage device and the at least one other storage device is completed at a different time than the asynchronous data replication between the second storage device and the at least one other storage device.

6. The non-transitory computer readable medium of claim 4, further comprising:
executable code that swaps operational control from the first and second hosts to at least one other host for the third storage device and the fourth storage device, wherein the at least one other host synchronously replicates data between the third storage device and the fourth storage device, the third storage device and the fourth storage device being coupled to the at least one other host, and wherein the data from the third storage device and the fourth storage device is asynchronously replicated to the first storage device and the second storage device, respectively.

7. A system for performing data replication, comprising:
a first storage device;
a second storage device;
a first host coupled to the first storage device and coupled to the second storage device using a first link between the first host and the second storage device that does not include the first storage device, wherein the first host uses the first link to synchronously replicate a first set of data to the second storage device that is initially written to the first storage device by the first host prior to being replicated to the second storage device;
a second host coupled to the first storage device and coupled to the second storage device using a second link between the second host and the first storage device that does not include the second storage device, wherein the second host uses the second link to synchronously replicate a second set of data to the first storage device that is initially written to the second storage device by the second host prior to being replicated to the first storage device;
a third storage device coupled to the first storage device; and
a fourth storage device coupled to the second storage device, wherein the first and the second sets of data are asynchronously replicated from the first storage device to the third storage device and asynchronously replicated from the second storage device to the fourth storage device, the third storage device and the fourth storage device passively receiving the first and the second sets of data.

8. The system of claim 7, wherein the first storage device is located at a different site than the second storage device, and wherein the third storage device and the fourth storage device are located at different remote sites.

9. The system of claim 7, wherein the asynchronous data replication between the first storage device and the third storage device is completed at a different time than the asynchronous data replication between the second storage device and the fourth storage device.

10. The system of claim 7, further comprising:
a non-transitory computer readable medium executable by at least one processor of the system, the non-transitory computer readable medium including:
executable code that swaps operational control from the first and second hosts to at least one other host for the third storage device and the fourth storage device, wherein the at least one other host synchronously replicates data between the third storage device and the fourth storage device, the third storage device and the fourth storage device being coupled to the at least one other host, and wherein the data from the third storage device and the fourth storage device is replicated to the first storage device and the second storage device, respectively.

* * * * *